(12) United States Patent
Kiriyama

(10) Patent No.: US 11,318,771 B2
(45) Date of Patent: May 3, 2022

(54) MOTOR DRIVING SYSTEM

(71) Applicant: Brother Kogyo Kabushiki Kaisha, Nagoya (JP)

(72) Inventor: Sachie Kiriyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/001,755

(22) Filed: Aug. 25, 2020

(65) Prior Publication Data

US 2021/0078345 A1 Mar. 18, 2021

(30) Foreign Application Priority Data

Sep. 13, 2019 (JP) .............................. JP2019-166986

(51) Int. Cl.
| | | |
|---|---|---|
| B41J 19/20 | (2006.01) | |
| B41J 29/38 | (2006.01) | |
| B41J 29/42 | (2006.01) | |
| B41J 11/00 | (2006.01) | |
| G01D 5/347 | (2006.01) | |
| H02P 6/16 | (2016.01) | |
| H02P 23/14 | (2006.01) | |

(52) U.S. Cl.
CPC .............. *B41J 29/42* (2013.01); *B41J 11/008* (2013.01); *B41J 19/207* (2013.01); *B41J 29/38* (2013.01); *G01D 5/34715* (2013.01); *G01D 5/34753* (2013.01); *H02P 6/16* (2013.01); *H02P 23/14* (2013.01); *B41J 2202/20* (2013.01)

(58) Field of Classification Search
None
See application file for complete search history.

(56) References Cited

U.S. PATENT DOCUMENTS

| | | | | |
|---|---|---|---|---|
| 8,177,320 B2 * | 5/2012 | Hagiwara | .............. | B41J 19/207 347/19 |
| 8,936,347 B2 * | 1/2015 | Sekino | .................. | B41J 19/202 347/37 |
| 2018/0272769 A1 | 9/2018 | Arakane et al. | | |

FOREIGN PATENT DOCUMENTS

| | | |
|---|---|---|
| JP | 2010-213424 A | 9/2010 |
| JP | 4941487 B2 | 5/2012 |
| JP | 2017-177700 A | 10/2017 |
| JP | 2018-161882 A | 10/2018 |

* cited by examiner

*Primary Examiner* — Alejandro Valencia
(74) *Attorney, Agent, or Firm* — Burr & Brown, PLLC

(57) ABSTRACT

There is provided a motor driving system in which an encoder sensor is configured to move with a driven object with respect to an encoder scale and output an encoder signal. A controller is configured to control a motor based on the encoder signal, thereby controlling movement of the driven object. The controller estimates an obstructing area. In the obstructing area, the encoder sensor reads a part of the encoder scale where an obstacle is adhered. The controller calculates a control error of the motor in the obstructing area based on the encoder signal output after the encoder sensor passes through the obstructing area, and determines a compensation amount of a controlling input value input during a period while the encoder sensor passes through the obstructing area.

8 Claims, 8 Drawing Sheets

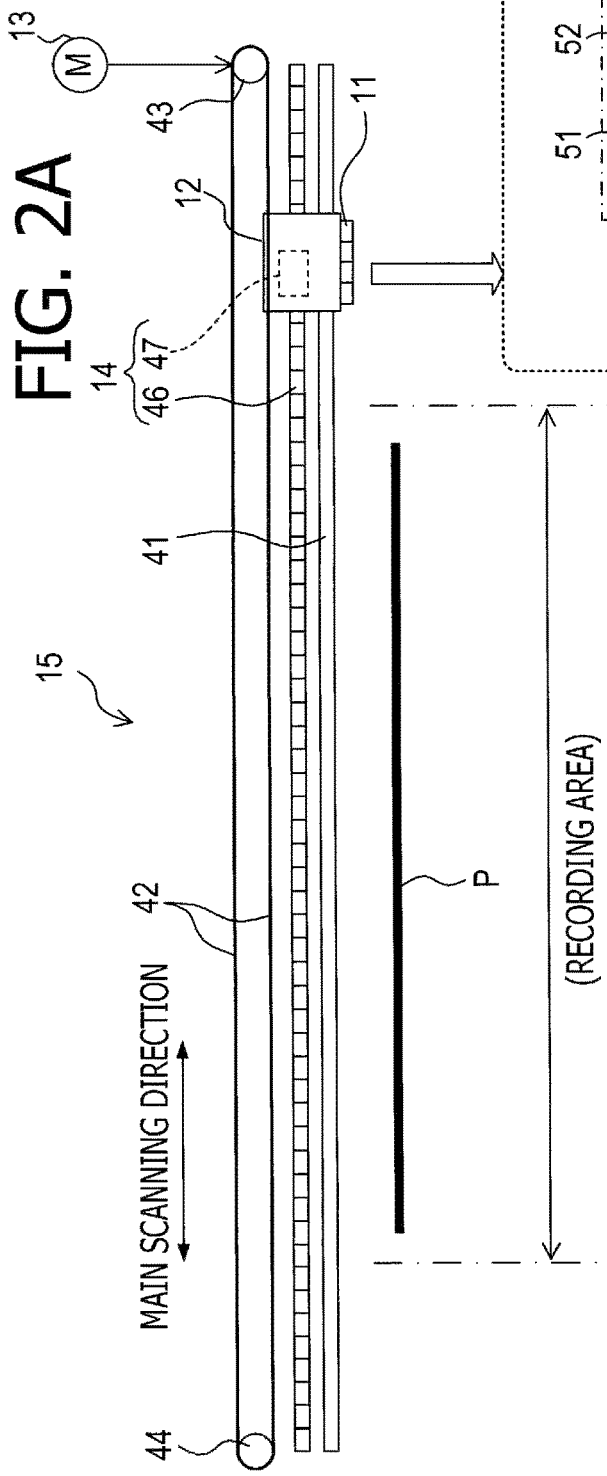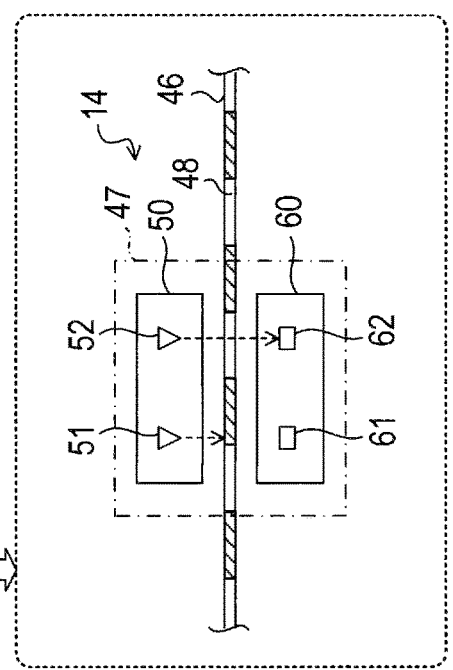

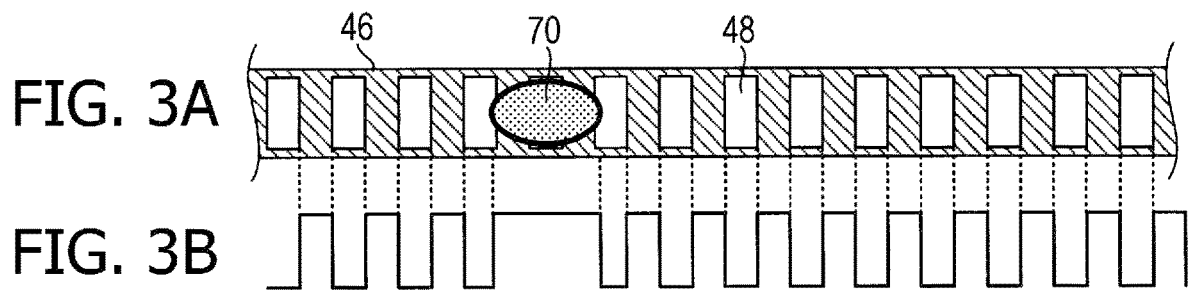
FIG. 3A
FIG. 3B
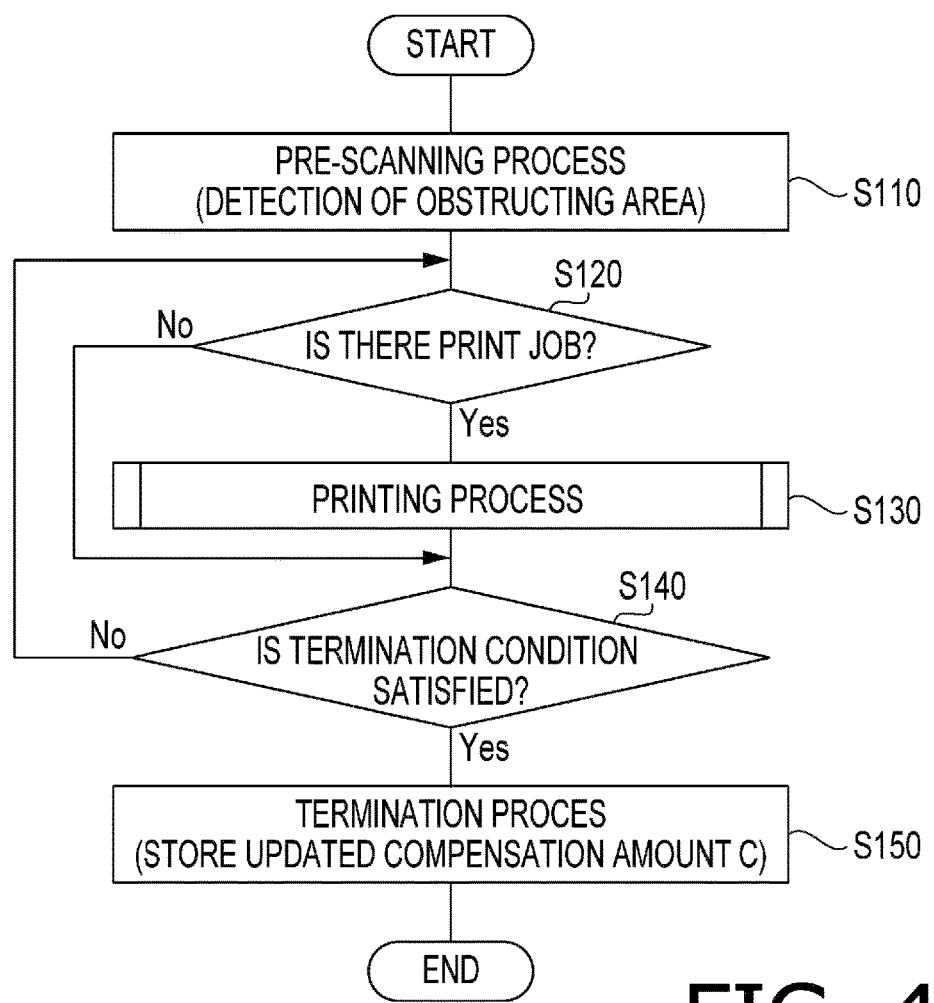
FIG. 4

MOTOR DRIVING SYSTEM

CROSS-REFERENCE TO RELATED APPLICATIONS

This application claims priority under 35 U.S.C. § 119 from Japanese Patent Application No. 2019-166986 filed on Sep. 13, 2019. The entire subject matter of the application is incorporated herein by reference.

BACKGROUND

Technical Field

The present disclosures relate a motor driving system.

Related Art

Conventionally, there has been known a system to control a motion of a motor-driven object by controlling a motor based on an input signal from an encoder. For example, in an inkjet printer, movement of a carriage is controlled by controlling the motor based on the input signal from the linear encoder to drive the carriage mounting an inkjet head with the motor. There is also known a machining tool such as a cutting machine in which a movement of a processing head configured to perform a cutting process is controlled based on an input signal from an encoder.

The assigner has disclosed a technique, in a field of inkjet printers, of switching a controlling method from a feedback controlling to another controlling method based on the input signal from the encoder in an abnormal area of an encoder scale in order to suppress a control abnormality which occurs as ink or grease is adhered to the encoder scale. According to the disclosed technique, in the abnormal area of the encoder, a control input to the motor is maintained to a value based on the control input before the encoder outputs a signal referring to the abnormal area of the encoder scale.

SUMMARY

According to the method to maintain the control value in the abnormal area, the longer the abnormal area is, the more a control error increases due to load based on the mechanical characteristic of a control object. That is, a moving state of the control object immediately after passage of the abnormal area will be widely different from a target state.

In a system for processing a processed object by controlling movement of a processing head, such an increase of the control error causes deterioration of processing accuracy with respect to the processed object. It is noted that an example of the processing is an image formation on a recording medium, and an example of deterioration of the processing accuracy includes deterioration of image quality of the image formed on the recording medium.

According to aspects of the present disclosure, there is provided a motor driving system having a motor, a driven object configured to be driven by the motor, an encoder having a scale part provided with a scale, and an encoder sensor configured to relatively move with respect to the scale part in association with the driven object, the encoder sensor being configured to output an encoder signal by reading the scale of the scale part, and a controller configured to control movement of the driven object by controlling the motor based on the encoder signal. The controller is configured to perform estimating an obstructing area within a moving range of the encoder sensor relative to the scale part based on the encoder signal, the obstructing area being an area corresponding to a portion of the scale part where an obstacle is adhered, the obstacle obstructing reading of the scale of the scale part by the encoder sensor, calculating a control error of the motor in the obstructing area based on the encoder signal output after the encoder sensor passes through the obstructing area, determining, based on the control error, a compensation amount of a controlling input value for the motor while the encoder sensor passes through the obstructing area, and controlling the motor such that controlling input value for the motor while the encoder sensor passes through the obstructing area is compensated based on the compensation amount.

BRIEF DESCRIPTION OF THE ACCOMPANYING DRAWINGS

FIGS. 2A and 2B show a structure of a printing mechanism and a linear encoder employed therein.

FIGS. 3A and 3B illustrate grime adhered to a linear scale.

FIG. 4 is a flowchart illustrating a main process executed by a processor.

DETAILED DESCRIPTION OF THE EMBODIMENT

Hereinafter, referring to the accompanying drawings, an illustrative embodiment of the present disclosures will be described.

Figure 1:
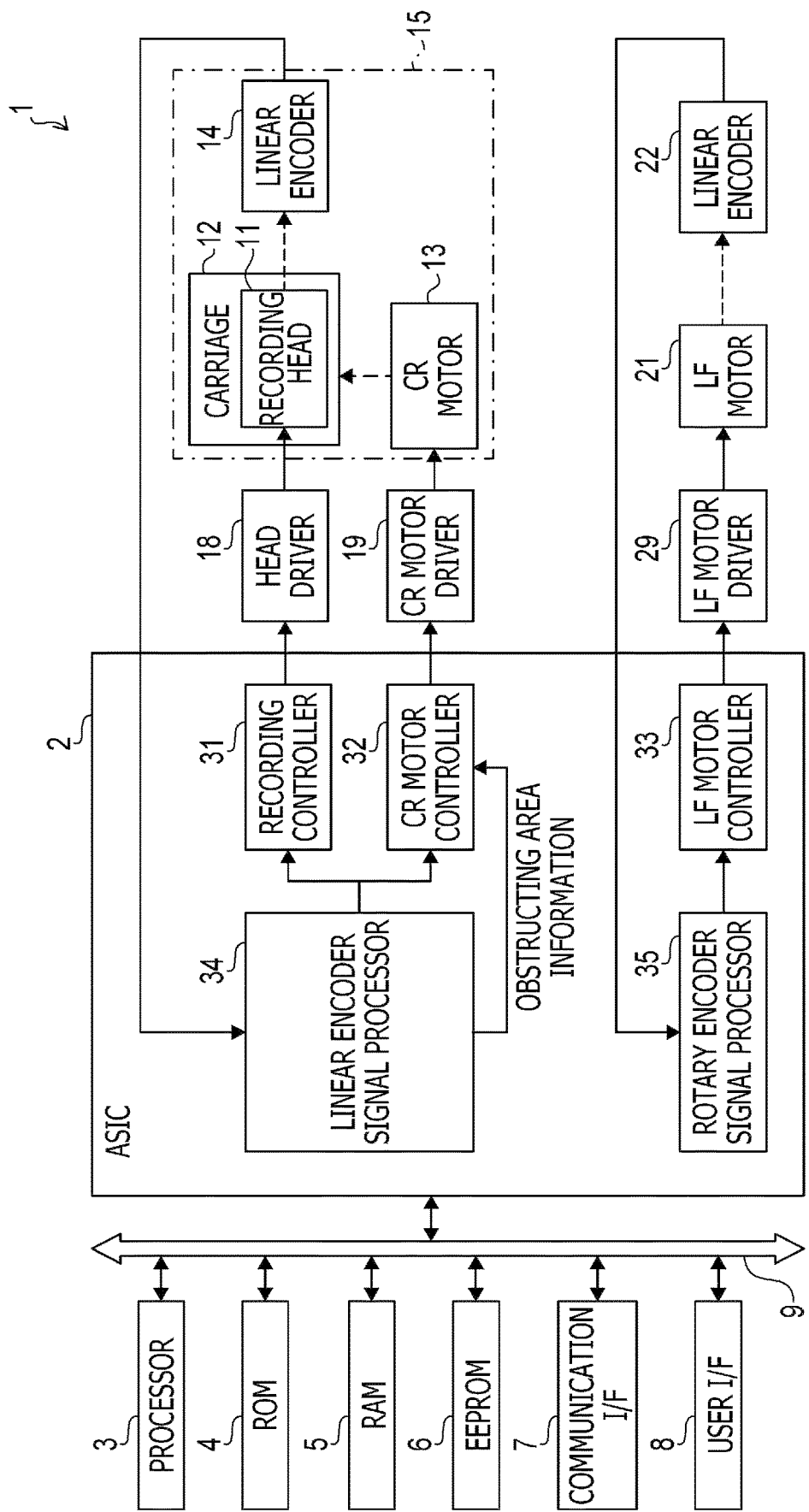
FIG. 1 is a block diagram showing a configuration of an image forming system according to present disclosures.
Figure 5:
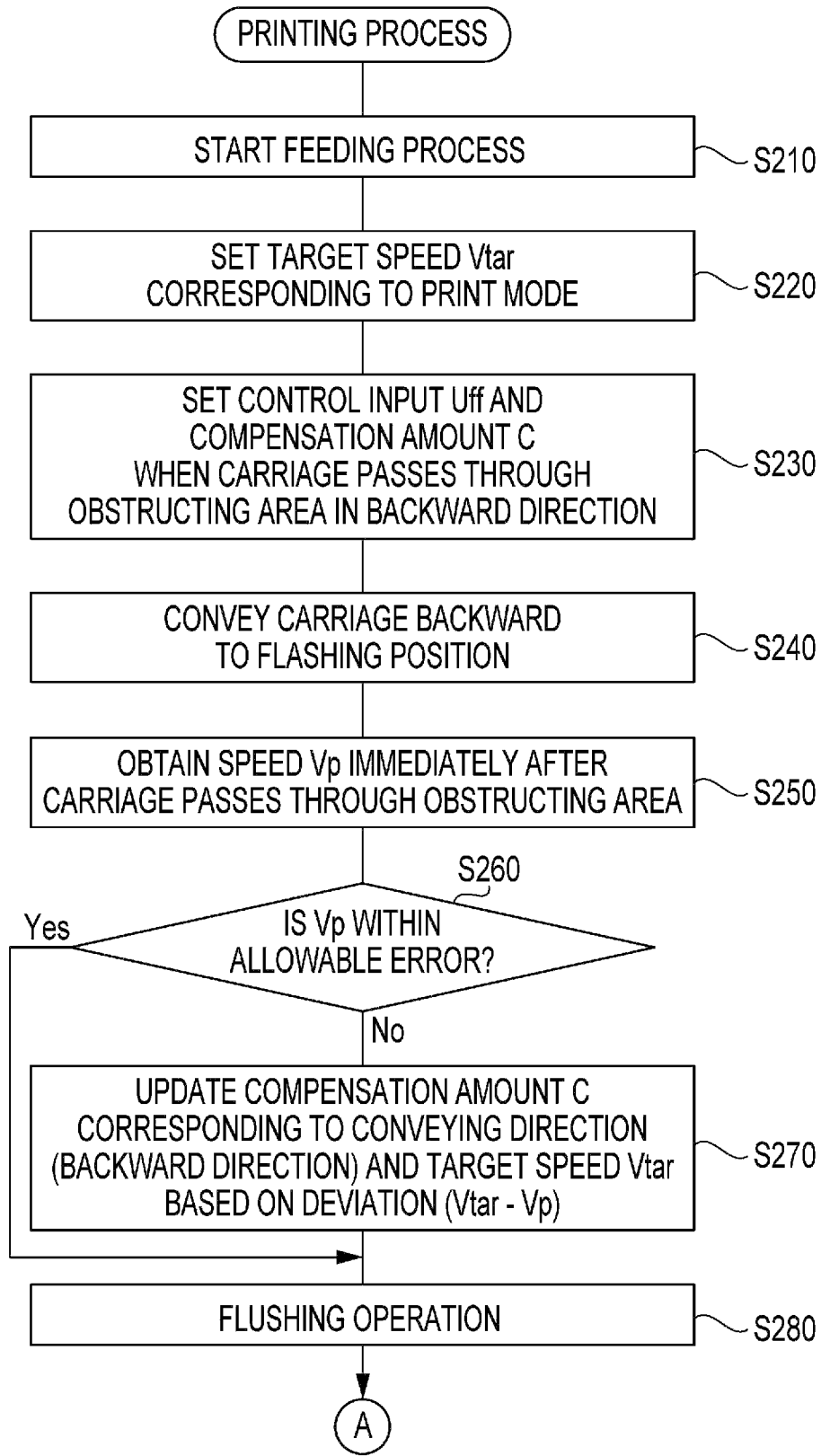
FIGS. 5, 6A and 6B show a flowchart illustrating a printing process executed by the processor.
Figure 6A:
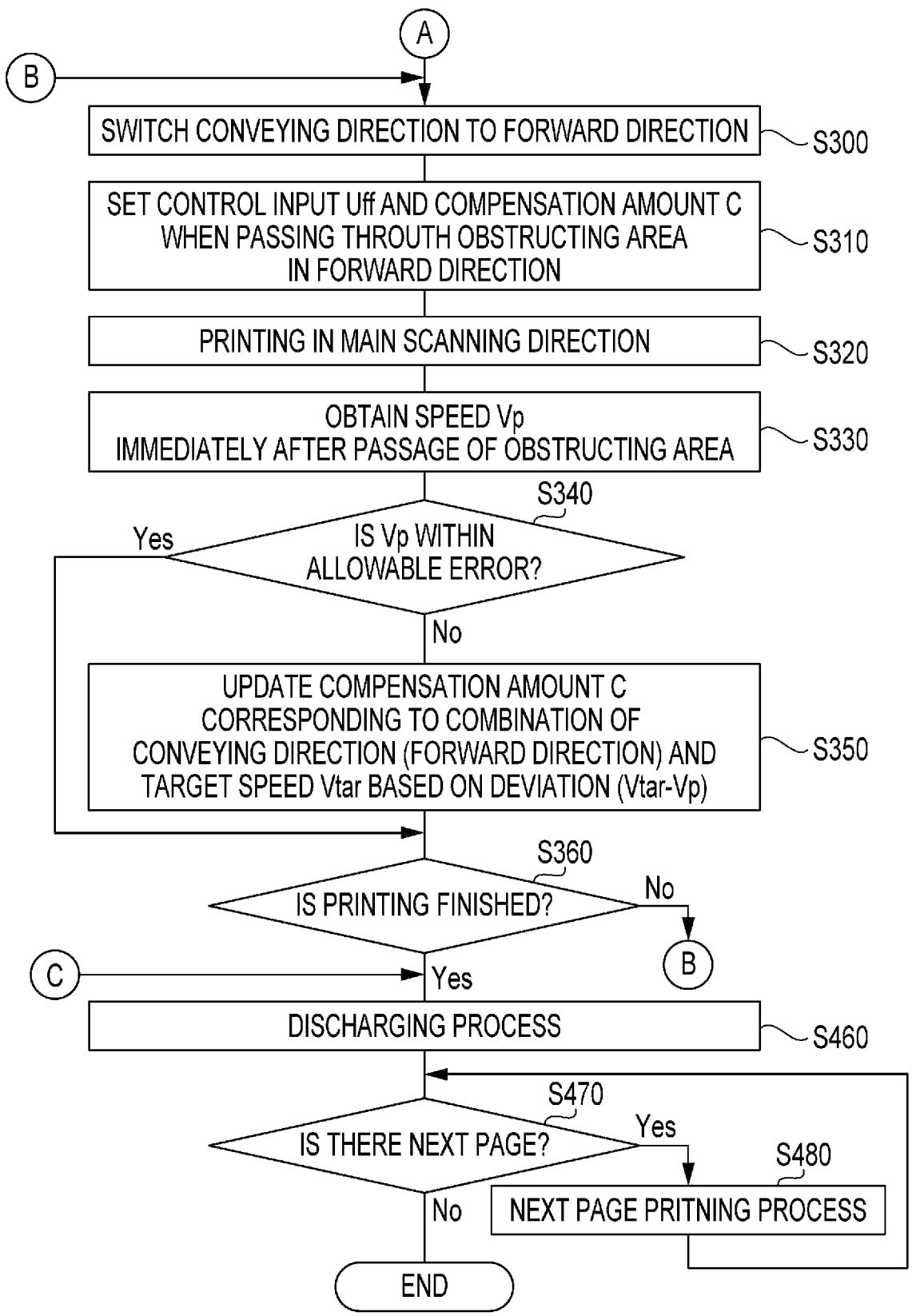
Figure 6B:
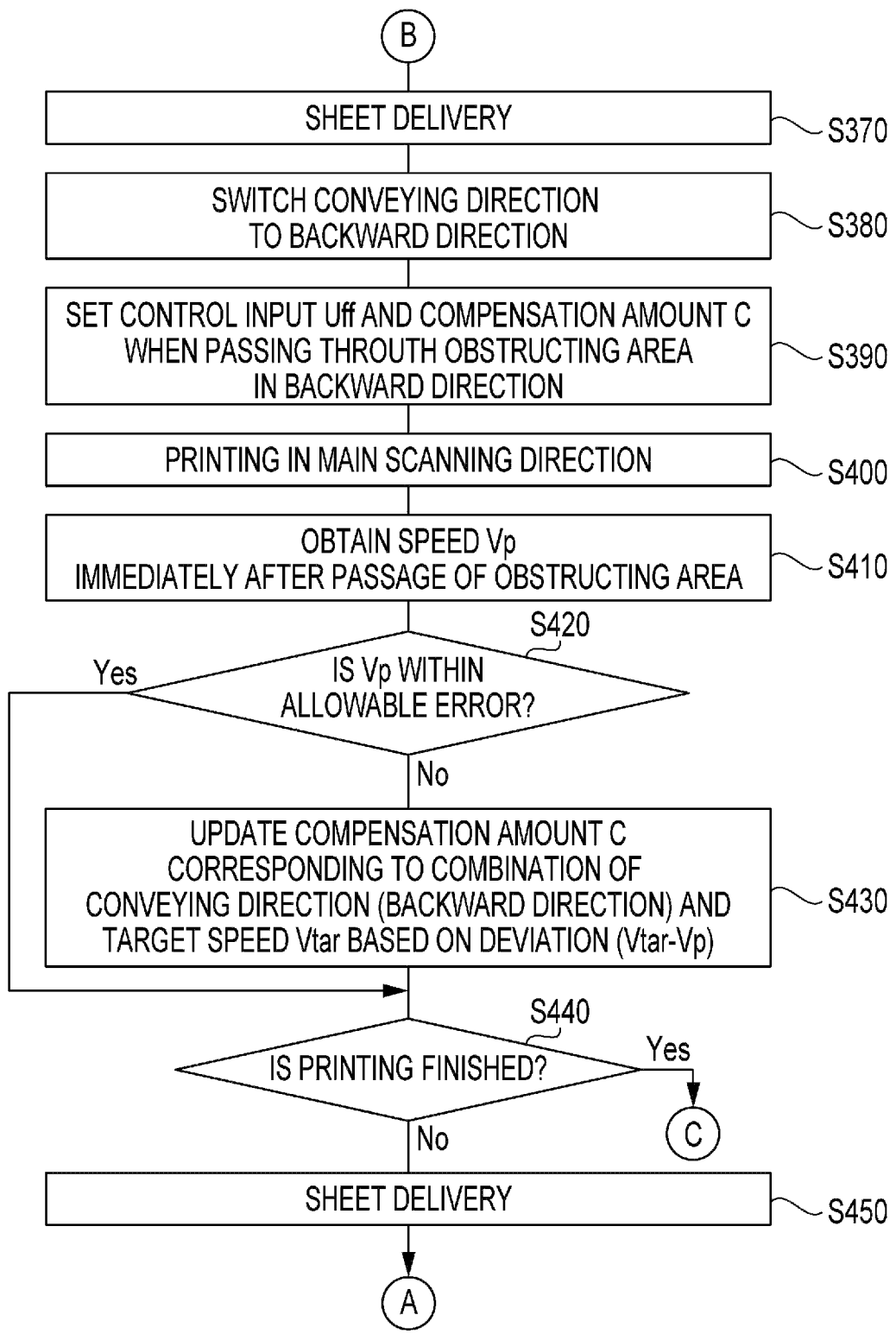

FIG. 1 is a block diagram of an image forming system 1 according to the embodiment of the present disclosures. The image forming system 1 is an inkjet printer configured to pick up printing sheets P accommodated in a sheet feed tray one by one in a separated manner, convey the same along a sheet conveying passage, and forms an image on the printing sheet P as conveyed.

The image forming system 1 has a recording head 11, a carriage 12, a carriage motor (CR motor) 13, a linear encoder 14, a line feed motor (LF motor) 21, and a rotary encoder 22.

The recording head 11 is an inkjet head provided with, on a bottom surface thereof, a plurality of arrays of nozzles respectively configured to eject ink droplets toward the printing sheet P arranged (conveyed) to face the bottom surface. It is noted that the recording head 11 is an example of a liquid droplet ejecting device. The carriage 12 mounts the recording head 11. The CR motor 13 is a DC (direct current) motor and serves as a driving source driving the carriage 12 in a main scanning direction, linearly and reciprocally. It is noted that the main scanning direction is a direction perpendicular to an auxiliary scanning direction which is a conveying direction of the printing sheet P.

The linear encoder 14 is an incremental type optical linear encoder. The linear encoder 14 is used to measure a motion parameter related to movement of the carriage 12. In the present embodiment, the motion parameter includes a position and a moving speed of the carriage 12 in the main scanning direction. The linear encoder 14 is an example of an encoder.

The LF motor 21 is a DC motor and serves as a driving source rotating a conveying roller (not shown) configured to convey the printing sheet in the auxiliary scanning direction. The rotary encoder 22 is also an incremental type optical rotary encoder and is used to measure a rotating amount and a rotating speed of the conveying roller as motion parameters of the conveying roller.

The image forming system 1 further includes a head driver 18, a CR motor driver 19, an LF motor driver 29 and an ASIC 2. The head driver 18 is configured to drive the recording head 11 so as to eject the ink droplets in accordance with a control signal input from the ASIC 2.

The CR motor driver 19 drives the CR motor 13 in accordance with the control signal input from the ASIC 2. The LF motor driver 29 drives the LF motor 21 in accordance with the control signal input from the ASIC 2.

The ASIC 2 is configured to control operations of each of the drivers 18, 19 and 29 by outputting the control signals thereto, respectively. The ASIC 2 is provided with a recording controller 31, a CR motor controller 32, an LF motor controller 33, a linear encoder signal processor 34, and a rotary encoder signal processor 35.

Referring to FIG. 2A, a concrete configuration of the printing mechanism 15 provided to the image forming system 1 will be described. The printing mechanism 15 has the carriage 12, the CR motor 13 and the linear encoder 14. The printing mechanism 15 is configured to move the carriage 12, which mounts the recording head 11 thereon, in the main scanning direction in accordance with the driving force provided from the CR motor 13.

In the printing mechanism 15 shown in FIG. 2A, a guiding shaft 41 is provided so as to extend in the main scanning direction (i.e., a width direction of the printing sheet P), and the carriage 12 mounting the recording head 11 is slidably fitted on the guiding shaft 41.

The carriage 12 is connected to an endless belt 42 which is arranged along the guiding shaft 41. Specifically, the endless belt 41 is wound around a driving pulley 43 provided at a position corresponding to an end of the guiding shaft 41, and a driven pulley 44 provided at a position corresponding to another end of the guiding shaft 41.

The driving pulley 43 is driven by the CR motor 13 to rotate, thereby the endless belt 42 is rotated. The carriage 12 moves, by the driving force provided from the CR motor 13 via a rotation of the endless belt 42, in the main scanning direction as guided by the guiding shaft 41.

In the vicinity of the guiding shaft 41, a linear scale 46 (which is an example of a scale part) is arranged along the guiding shaft 41 (i.e., along a moving passage of the carriage 12). The linear scale 46 has a plate shape elongating in the width direction. The carriage 12 mounts thereon an optical sensor 47 (which is an example of an encoder sensor) provided with a light emitter 50 and a light receiver 60. It is noted that a shape of the linear scale 46 is not limited to a plate shape. The linear scale 46 may have a bar shape elongating in the width direction.

The linear encoder 14 consists of the optical sensor 47 and the linear scale 46. In FIG. 2B, a detailed configuration of the optical sensor 47 is shown within in a square portion surrounded by a dotted line.

As shown in FIG. 2B, the linear scale 46 has multiple slits 48, which are arranged at a particular interval, in its extending direction which is parallel with the main scanning direction. The slits 48 are example of a scale provide to a scale part. The slits 48 may be holes or portions formed with a transparent member which allows light to pass therethrough. The light emitter 50 and the light receiver 60 of the optical sensor 47 are arranged to face each other with the linear scale 46 arranged therebetween.

The light emitter 50 has two light emitting elements (i.e., an A-phase light emitting element 51 and a B-phase light emitting element 52). The light receiver 60 has two light receiving elements (i.e., an A-phase light receiving element 61 and a B-phase light receiving element 62), which correspond to the two light emitting elements. The light emitted by the A-phase light emitting element 51 is received by the A-phase light receiving element 61, and the light emitted by the B-phase light emitting element 52 is received by the B-phase light receiving element 62.

The optical sensor 47 is fixed on the carriage 12 and moves, in the main scanning direction, along the linear scale 46, together with the carriage 12. As the carriage 12 moves in the main scanning direction, the optical sensor 47 moves, relative to the linear scale 46, in association with movement of the carriage 12 in the main scanning direction.

Due to change of a relative position between the optical sensor 47 and the linear scale 46, light receiving states of the light receiving elements 61 and 62 change, respectively. The optical sensor 47 outputs two types of pulse signals corresponding to light receiving states as encoder signals.

That is, the optical sensor 47 outputs two types of pulse signals having a particular phase difference (which is, according to the embodiment, 90 degrees). A first pulse signal is an A-phase signal corresponding to the light receiving state of the A-phase light receiver 61, and a second pulse signal is a B-phase signal corresponding to the light receiving state of the B-phase light receiver 62.

According to the embodiment, the A-phase signal is output as a low-level signal when the A-phase light receiving element 61 is receiving the light emitted by the A-phase light emitting element 51, while the A-phase signal is output as a high-level signal when the A-phase light receiving element 61 is not receiving the light.

When a moving direction of the carriage 12 is a forward direction (i.e., a direction from the driven pulley 44 toward the driving pulley 43), which is a rightward direction in FIG. 2A, the phase of the A-phase signal precedes the B-phase signal by 90 degrees. When the moving direction of the carriage 12 is a backward direction (i.e., a direction from the driving pulley 43 toward the driven pulley 44), which is a leftward direction in FIG. 2A, the phase of the A-phase signal is delayed with respect to the B-phase signal by 90 degrees. The A-phase signal and the B-phase signal are input to the linear encoder signal processor 34 in the ASIC 2.

The linear encoder signal processor 34 is configured to determine a moving direction of the carriage 12 and measure a position and a moving speed of the carriage 12 based on the encoder signals (i.e., the A-phase signal and the B-phase signal) input from the linear encoder 14. The measured values of the position and the speed of the carriage 12 (i.e., measured values of motion parameters) are input to the recording controller 31 and the CR motor controller 32.

It is noted that the measurement of the position and the speed of the carriage 12 by the linear encoder signal processor 34 is performed based on at least one of the A-phase signal and the B-phase signal. In the following description, for brevity, a case where the measurement of the position and the speed of the carriage 12 is performed based on the A-phase signal will be described.

According to this example, the encode single processor 34 detects rising edges and falling edges of the A-phase signal input from the linear encoder 14. Then, the linear encoder signal processor 34 updates a count value of a position counter (not shown) at every detection of the edge. According to the present embodiment, the position of the carriage 12 is measured based on the count value of the edges.

The linear encoder signal processor 34 measures, synchronously with a detection timing of each edge of the A-phase signal, an edge interval (i.e., a time interval from detection of a previous edge to detection of the current edge), thereby measuring a moving speed of the carriage 12. The moving speed is proportional to an inverse of the edge interval. The measurement of the position and the speed using the "encoder signal" in the following description may be regarded as those using the A-phase signal as described above.

The recording controller 31 generates a control signal to control the recording head 11 based on the measured values, input from the linear encoder signal processor 34, of the motion parameters regarding the carriage 12 (i.e., the measured values of the position of the carriage 12), and outputs the generated control signal to the head driver 18. The head driver 18 drives the recording head 11 in accordance with the control signal input from the recording controller 31, thereby causing the recording head 11 to eject ink droplets in accordance with its position.

The CR motor controller 32 calculates, at every particular controlling period, a controlling input value U for the CR motor 13 in accordance with the measured values of the motion parameters of the carriage 12 input from the linear encoder signal processor 34 in order to perform a feedback controlling of the movement of the carriage 12. The controlling input value U is, for example, an applied power (a current or a voltage) to be applied to the CR motor 13.

The CR motor controller 32 inputs, to the CR motor driver 19, a PWM signal for supplying an electric power, which corresponds to the calculated controlling input value U, to the CR motor 13 as a control signal for controlling the CR motor 13.

The CR motor driver 19 drives the CR motor 13 such that the electric power corresponding to the above-mentioned controlling input value U is supplied to the CR motor 13 in accordance with the control signal input from the CR motor controller 32. The CR motor 13 rotates as the electric power is received from the CR motor driver 19. Driven by the CR motor 13, the carriage 13 and the recording head 11 move in the main scanning direction.

The rotary encoder 22 is configured to output two kinds of pulse signals having a particular phase difference (90 degrees in the present embodiment) as the encoding signal. The encoder signals are input to the rotary encoder signal processor in the ASIC 2.

The rotary encoder signal processor 35 measures a rotation amount and a rotation speed of a conveying roller configured to convey the printing sheet P based on the encoder signal input from the rotary encoder 22. The measured values of the motion parameters are input to the LF motor controller 33.

For performing a feedback controlling with respect to a rotational movement of the conveying roller, the LF motor controller 33 calculates, based on the measured values of the motion parameters regarding the conveying roller input from the rotary encoder signal processor 35, a control input to the LF motor 21 at every controlling period. Then, the LF motor controller 33 inputs, to the LF motor driver 29, the PWM signal for supplying the electric power corresponding to the calculated control input to the LF motor 21, as the control signal for the LF motor 21.

The LF motor driver 29 drives the LF motor 21, in accordance with the control signal input from the LF motor controller 33, such that the electric power corresponding to the control input is supplied to the LF motor 21. The LF motor 21 rotates as the electric power is supplied from the LF motor driver 29. The conveying roller is rotated by the LF motor 21, thereby the printing sheet P moves in the auxiliary scanning direction.

The image forming system 1 has a processor 3, a ROM 4, a RAM 5, an EEPROM 6, a communication I/F 7 and a user I/F 8, which are connected to the ASIC 2 through a bus 9.

The processor 3 is configured to collectively control various components of the image forming system 1. The ROM 4 is configured to store computer program to be executed by the processor 3. The RAM 5 is used as a work area when the processor 3 executes the computer program. The EEPROM 6 is an electrically data-erasable and data-rewritable non-volatile memory, and is configured to store therein data/information which is to be maintained even after the image forming system 1 is powered off.

The communication I/F 7 is configured to communicate with an external device such as a personal computer. The user I/F 8 is provided with an operation panel to be operated by the user and a display configured to display various pieces of information to be viewed by the user.

Incidentally, in the image forming system 1, there could be a case where the speed and/or the position of the carriage 12 may not be measured normally as dirt 70 adhered to the linear scale 46 of the linear encoder 14.

In an example shown in FIG. 3A, the dirt 70 is adhering to a portion of the linear scale 46, and the slit 48 formed at the portion is covered with the dirt 70. Therefore, through the slit 48 covered by the dirt 70, the light emitted by the light emitting element 51 or 52 does not reach the light receiving element 61 or 62.

As described above, the dirt 70 could be an obstacle when the optical sensor 47 reads the slits 48 of the linear scale 46 by emitting and receiving light. The dirt 70 may be formed as grease, ink and/or paper powders are adhered to the linear scale 46.

FIG. 3B shows an example of a waveform of the encoder signal output by the optical sensor 47 which moves over the linear scale 46 as shown in FIG. 3A at a constant speed. The encoder signal shown in FIG. 3B may be regarded as the A-phase signal or the B-phase signal. According to the example shown in FIG. 3B, an edge interval (i.e., an interval between edges of adjacent pulses), which should be a fixed length, is tripled when the optical sensor 4 moves over the dirt 70.

According to the present embodiment, the moving speed of the carriage 12 is measured based on the edge intervals. Therefore, a variation of the edge interval due to the dirt 70 as described above may cause a discontinuous error in the measured value of the speed. Such an error causes deterioration of the control accuracy when performing the feedback controlling of the moving speed of the carriage 12.

The deterioration of the control accuracy may obstruct a constant speed movement of the carriage 12. When an image is recording on the printing sheet P by ejecting the ink droplets from the recording head 11 with moving the carriage 12 in the main scanning direction, the ink droplets 11 performs inertia movement in the main scanning direction during the ink droplets travel toward the printing sheet P (i.e., after ejected from the recording head and before reaching the printing sheet P). Therefore, the unstable speed of the carriage 12 causes deviation of the impact points, on the printing sheet P, of the ink droplets, thereby the quality of the image formed on the printing sheet P being deteriorated.

In order to solve the above problem, according to the present embodiment, an area where the dirt 70 is adhered is estimated and a feedforward controlling of the carriage 12 is performed for the area where the dirt 70 is adhered to eliminate the affection of the measurement error. It is noted that the area where the dirt 70 is adhered is an area where reading of the slits 48 and a normal measurement of the motion parameter are obstructed. In the following description, a moving range of the carriage 12 within which the optical sensor 47 reads the area of the linear scale 46 where the dirt 70 is adhered will be referred to as an "obstructing area."

In other words, the obstructing area is within a moving range of the optical sensor 47 relative to the linear scale 46 and is a relative moving range of the optical sensor 47 where the optical sensor 47 reads a portion of the linear scale 46 where the dirt 70 (which is an obstacle obstructing reading by the optical sensor 47) is adhered. According to the present embodiment, the optical sensor 47 reads the linear scale 46 from along a direction perpendicular to a surface of the linear scale 46. Therefore, the obstruction area corresponds to the moving range of the carriage 12 when the optical sensor 47 faces the dirt 70 adhered onto the linear scan 46.

According to the present embodiment, the controller 30 calculates a compensation amount C for the control input to the CR motor 13 to be used in the feedforward controlling based on the measured value of the moving speed of the carriage 12 which is normally measured immediately after the carriage 12 passed the obstructing area. When the carriage 12 passes the obstructing area next time, the controller 30 suppresses the control error, which would be caused by the feedforward controlling, by compensating the control input based on the compensation amount C. In the following description, a printing process including such a control will be described in detail, referring to flowcharts shown in FIG. 4-FIG. 7.

According to the present embodiment, when the image forming system 1 is powered on or a sleep mode of the image forming system 1 is released, the image forming system 1 is invoked and the processor 3 starts executing a process shown in FIG. 4. When the process shown in FIG. 4 is started, the processor 3 executes a pre-scanning process and estimates the obstructing area of the linear scale 46 (S110).

In the pre-scanning process, the ASIC 2 executes, in accordance with an instruction from the processor 3, a drive control of the CR motor 13 to move the carriage 12 backwardly from an end to the other end of the movable range in the main scanning direction, and further, move the cartridge 12 forwardly from the other end to the end in the main scanning direction.

The position on the linear scale 46 of the obstructing area is estimated based on the count value of the position counter counted by the linear encoder signal processor 34 when a speed abnormality of the carriage 12 is detected. For example, a first count value of the position counter, which is counted from when the carriage 12 is started to move backwardly from a first end point within the movable range thereof until the speed abnormality is detected, is counted.

Further, a second count value of the position counter, which is counted from when the carriage 12 is started to move forwardly from a second end point within the movable range thereof until the speed abnormality is detected, is counted. The obstructing area is estimates as an area extending in the main scanning direction between a point on the linear scale 46 corresponding to the first count value and a point on the linear scale 46 corresponding to the second count value.

Whether or not the speed abnormality is caused by the dirt 70 adhered onto the linear scale 46 is determined based on whether the count value when the carriage 12 is moved from one end to the other end of the linear scale 46 coincide with a design value. The obstructing area information estimated in the pre-scanning process is recorded in a register of the ASIC 2, the obstructing area information being shared by the CR motor controller 32 and the linear encoder signal processor 34 in the ASIC 2.

The obstructing area information recorded in the register may include a start point and an end point of the obstructing area when the carriage 12 moves forward, and a start point and an end point of the obstructing area when the carriage 12 moves backward. Optionally or alternatively, in the register, the starting point and the width of the obstructing area when the carriage 12 moves in each direction may be stored as the obstructing area information. It is noted that the width of the obstructing area corresponds to a changing amount of the position counter when the carriage 12 moves from one end to the other end of the obstructing area without the dirt 70.

The estimation of the obstructing area may be performed in the ASIC 2 (i.e., by the linear encoder signal processor 34) or by the processor 3 based on the first count value and the second count value obtained from the ASIC 2.

After executing S1100, the processor 3 determines whether there remains unprocessed print jobs (S120). It is noted that the print job is received from the external device through the communication I/F 7. When it is determined that there is no unprocessed print job (S120: NO), the processor 3 performs S140.

When it is determined that there remain unprocessed print jobs (S120: YES), the processor 3 performs S130 and performs the printing process shown in FIGS. 5, 6A and 6B. By the printing process, the image based on print target data corresponding to the print job is formed on the printing sheet P. The printing sheet P on which the image is formed is discharged onto a sheet discharge tray of the image forming system 1.

Completing the printing process, the processor 3 performs S140. In S140, the processor 3 determines whether a termination condition is satisfied. For example, when an operation to power off the image forming system 1 is performed or an operation mode of the image forming apparatus is changed to the sleep mode, it is determined that the termination condition is satisfied.

When it is determined that the termination condition is not satisfied (S140: NO), the processor 3 performs S120. As above, the process 3 is in a stand-by state until an unprocessed print job occurs or the termination condition is satisfied.

When it is determined that the termination condition is satisfied (S140: YES), the processor 3 performs a particular termination process (S150) and terminates the processes shown in FIG. 4. It is noted that, the termination process includes a process of storing the compensation amount C updated in the printing process called in S130 in the EEPROM 6.

When the printing process (S130) is started (see FIGS. 5, 6A and 6B), the processor 3 starts a feeding process (S210). In the feeding process, the processor 3 transmits instructions to the ASIC 2 to cause the LF motor controller 33 to control the LF motor 21 so that one of the printing sheets P accommodated in the sheet tray is picked up and conveyed, in the auxiliary scanning direction, to a position corresponding to an ejection position of the ink droplets by the recording head 11.

Thereafter, the processor 3 sets a target speed Vtar, which is a target speed of the movement of the carriage 12 in the main scanning direction, to a particular speed corresponding to the print mode designated for the print job (S220). The print mode may be categorized by a print quality and include a standard image quality mode, a high image quality mode or the like. The target speed Vtar is defined for each print mode in advance.

Further, the processor sets a standard controlling input value Uff and a compensation amount C to values in accordance with the moving direction and the target speed Vtar of the carriage 12 corresponding to the obstruction area (S230). The standard controlling input value Uff is a normally employed controlling input value to the CR motor in the feedforward controlling, and the compensation amount C is a compensation amount for the standard controlling input value Uff. Specifically, the processor sets the standard controlling input value Uff and the compensation amount C in the register of the ASIC 2.

In the EEPROM 6, the standard controlling input value Uff and the compensation amount C to be set when the carriage 12 passes the obstructing area in the forward direction are stored for each target speed Vtar. Further, in the EEPROM 6, the standard controlling input value Uff and the compensation amount C to be set when the carriage 12 passes the obstructing area in the backward direction are also stored for each target speed Vtar.

It is noted that the standard controlling input value Uff is preliminarily defined by a designer of the image forming system 1, and recorded in the EEPROM 6 when the image forming system 1 shipped from a factory. An initial value of the compensation amount C is zero, updated in the printing process, and stored in the EEPROM 6 in the process of S150 described above.

In S230, the processor 3 refers to the EEPROM 6 and identifies the standard controlling input value Uff and the compensation amount C, which correspond to the target speed Vtar set in S220, to be set when the carriage 12 passes the obstructing area in the backward direction, and sets the identified standard controlling input value Uff and the compensation amount C in the register of the ASIC 2. It is noted, however, in a circumstance where the compensation amount C has been updated in a process that will be described later, the latest (i.e., the updated) compensation amount C is set to the register of the ASIC 2.

Thereafter, the processor 3 proceeds to S240. In S240, the processor inputs an instruction to the CR motor controller 32 so as to move the carriage 12, in the backward direction, in accordance with the above-set target speed Vtar, the standard controlling input value Uff and the compensation amount C.

According to the present embodiment, a home position of the carriage 12 is defined at a most downstream position in the forward direction. The carriage 12 is normally, except in a printing process executing period, positioned at the home position. When the carriage 12 is positioned at the home position, the recording head 11 is capped.

On the other hand, at a most upstream position in the forward direction, an ink receiving plate for receiving ink droplets, which are ejected when the recording head 11 performs a flushing operation, is provided. That is, the flushing is performed at the most upstream side position in the forward direction, and the position is defined as a flushing position.

In S240, the processor 3 inputs an instruction to the CR motor controller 32 so that the carriage 12 is moved from the home position to the flushing position in order to make the recording head 11 perform the flushing operation as a preparation process before printing.

Figure 7:
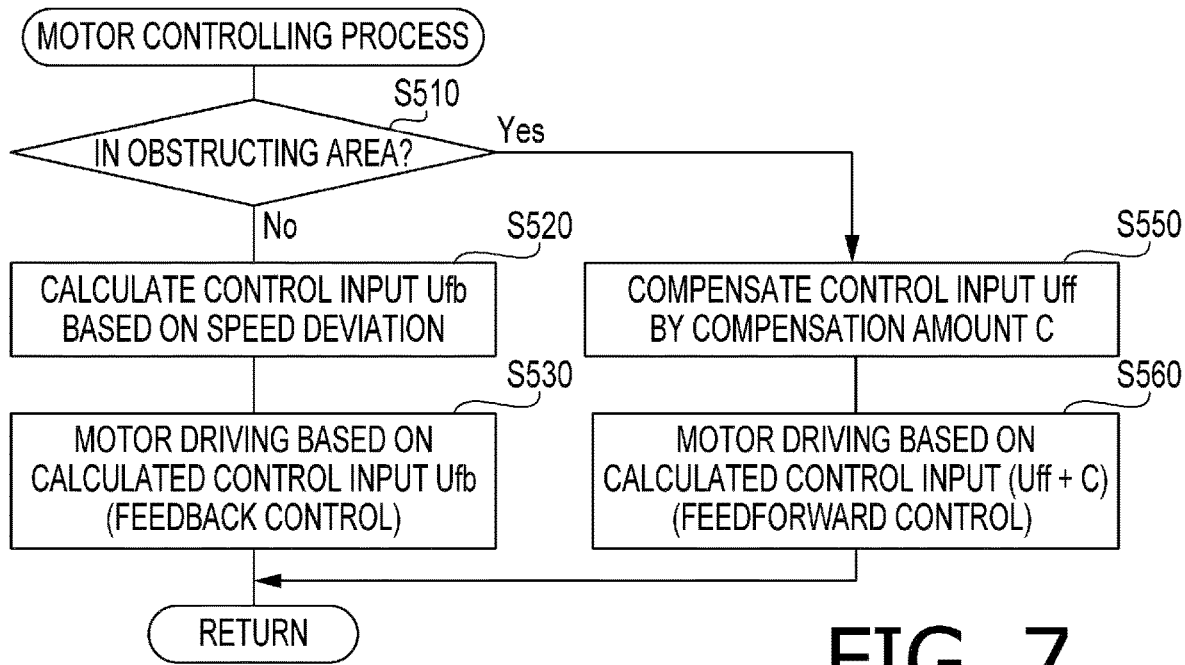
FIG. 7 is a flowchart illustrating a motor controlling process executed by the processor.

Receiving the instruction from the processor 3 in S240, the CR motor controller 32 executes a motor controlling process shown in FIG. 7 at every particular controlling period to control the CR motor 13. When the motor controlling process shown in FIG. 7 is started, the CR motor controller 32 determines whether the carriage 12 is positioned within the obstructing area (S510) based on the position of the carriage 12 input from the linear encoder signal processor 34.

When it is determined that the carriage 12 is not positioned within the obstruction area (S510: NO), the CR motor controller 32 calculates a deviation E between a measurement value Vm of a speed of the carriage 12 input from the linear encoder signal processor 34 and a standard speed Vref in accordance with an equation E=Vref−Vm, and calculates a feedback controlling input value Ufb based on the deviation E (S520).

Within a constant speed moving area of the carriage 12, the standard speed Vref coincides with the target speed Vtar (i.e., Vref=Vtar). The constant speed moving area corresponds to an area, in the main scanning direction, within which an ejection operation of the recording head 11 to eject the ink droplets is performed. Further, in an acceleration area and a deceleration area of the carriage 12, which are adjacent to the constant speed area, the standard speed Vref is set to speeds corresponding to locus speeds to be realized during acceleration and deceleration of the carriage 12, respectively.

The CR motor controller 32 inputs the deviation E in a particular transfer function and calculates a feedback controlling input value Ufb to reduce the deviation E. It is noted that the CR motor controller 32 may calculates the feedback controlling input value Ufb corresponding to the deviation E by a PID (Proportional Integrated Differential) control.

The CR motor controller 32 determines the feedback controlling input Ufb calculated above as the controlling input value U to be input to the CR motor 13. Thereafter, the CR motor controller 32 inputs a controlling signal to realize the controlling input value U in the CR motor driver 19 (S530). Then, the CR motor driver 19 drives the CR motor 13 with a driving electric power corresponding to the controlling input value U determined as above.

As described above, when the carriage 12 is positioned outside the obstructing area, the CR motor controller 32 performs the feedback controlling based on the equation, $$E = V\text{ref} - Vm$$

where, E represents the deviation, Vm represents a measurement value of the speed, and Vref represents the standard speed.

When it is determined that the carriage 12 is positioned within the obstructing area (S510: YES), the CR motor controller 32 performs S550. In S550, the CR motor controller 32 determines a value obtained by adding the standard controlling input value Uff set to the register and the compensation amount C as the controlling input value U to be input to the CR motor 13 (i.e., U=Uff+C).

Thereafter, the CR motor controller 32 inputs a controlling signal realizing the controlling input value U determined as above to the CR motor driver 19 (S560). Then, the CR motor driver 19 drives the CR motor 13 with the driving electric power corresponding to the controlling input value U determined as above.

As described above, when the carriage 12 is positioned within the obstructing area, the CR motor controller 32 performs the feedforward controlling of the CR motor 13 based on the standard controlling input value Uff and the compensation amount C, otherwise the feedback controlling.

Figure 8:
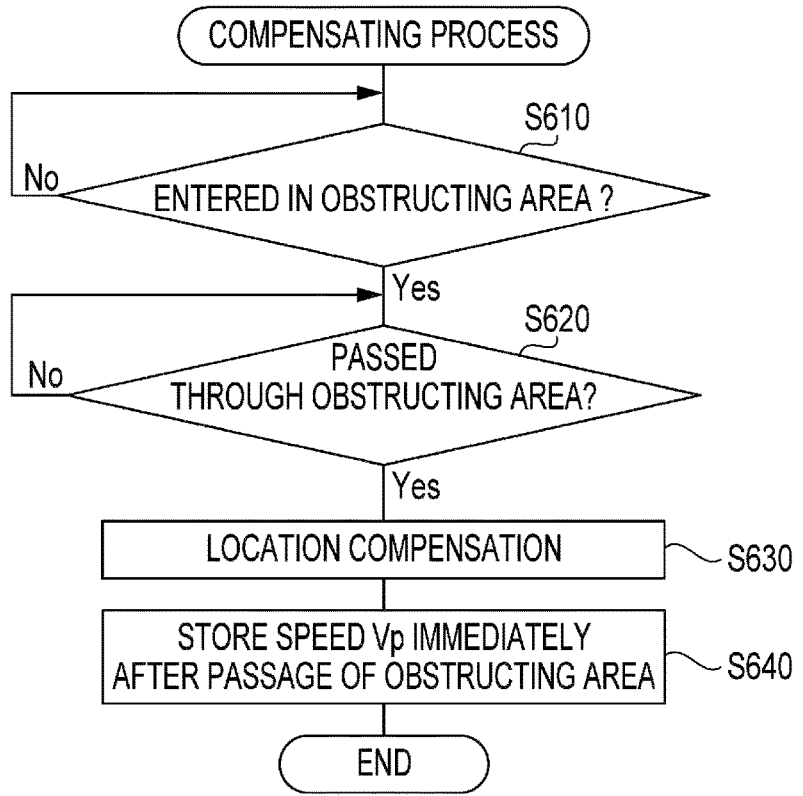
FIG. 8 is a flowchart illustrating a compensating process performed by a linear encoder processing part.

On the other hand, the linear encoder signal processor 34 repeatedly performs, based on the encoder signal, a compensating process shown in FIG. 8 separately from the process of calculating measured values of the position and the speed of the carriage 12.

When the compensating process is started, based on the measured value of the position of the carriage 12, the linear encoder signal processor 34 operates in a standby state until the carriage 12 enters into the obstructing area (S610). When it is determined that the carriage 12 has entered the obstructing area (S610: YES), the linear encoder signal processor 34 operates in the standby state until the carriage 12 passes through the obstructing area (S620).

When it is determined that the carriage 12 has passed through the obstructing area (S620: YES), the linear encoder signal processor 34 compensates for an error, which is caused in the obstructing area, in the count value of the position counter (S630). Further, the linear encoder signal processor 34 stores, in the ASIC 2, a measured value Vp of the speed of the carriage 12 which is measured based on the edge interval between the pulse edge of the encoder signal that is firstly generated after the carriage 12 has passed through the obstructing area to the next pulse edge as the speed of the carriage 12 immediately after the carriage 12 has passed through the obstructing area (S640). Then, the compensating process shown in FIG. 8 is terminated. In the compensating process, the information regarding the speed Vp stored in the ASIC 2 is retrieved by the processor 3.

When the carriage 12 moves to the flushing position and stops there as the instruction is input to the CR motor controller 32 in S240 (see FIG. 5), the processor 3 proceeds to S250 and obtains the speed Vp, which is the speed immediately after the carriage 12 has passed through the obstructing area, from the ASIC 2. The speed Vp is a speed measured while the carriage 12 moves to the flushing position.

The processor 3 further determines whether the speed Vp obtained as above is within an allowable error range with respect to the target speed Vtar (S260). When the allowable error range is defined by a rate α with respect to the target speed Vtar, the processor 3 can determine whether or not the speed Vp is within the allowable error range based on whether the speed Vp satisfies a relationship:

$$(1-\alpha) \times Vtar < Vp < (1+\alpha) \times Vtar.$$

For example, when the allowable error range of the speed Vp is defined less than five percent of the target speed Vtar, the processor 3 determines whether the speed Vp satisfies a relationship:

$$(1-0.05) \times Vtar < Vp < (1+0.05) \times Vtar.$$

When it is determined that the speed Vp is not within the allowable error range (S260: NO), the processor 3 proceeds to S270 and updates the current compensation amount C, which corresponds to the standard controlling input value Uff for moving the carriage 12 backwardly at the target speed Vtar, into C0+δC. Where C0 is a current (i.e., before updating) compensation amount C and δC is a value corresponding to the speed deviation (i.e., Vtar−Vp).

The increment δC is determined such that the speed deviation in the next and subsequent carriage movement can be suppressed. Specifically, the increment δC is determined to be proportional to the speed deviation (Vtrar−Vp), that is, β·(Vtar−Vp). It is noted that the increment δCa could be a positive value or a negative value.

Figure 9A:
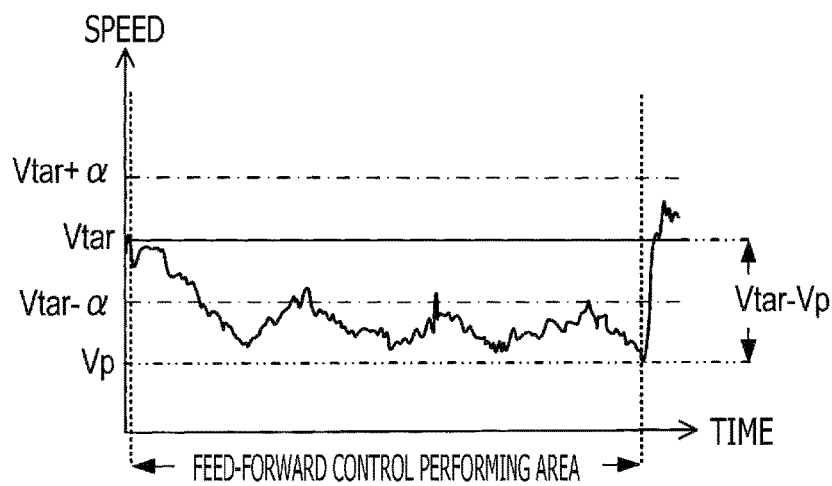
FIG. 9A is a graph showing a change of a speed when a feedforward controlling is performed based on a control input which has not been compensated.

FIG. 9A is a graph showing time variation of the speed of the carriage 12 observed when the feedforward controlling of the CR motor 13 is performed with the compensation amount C being set to zero and the standard controlling input value Uff being used, a horizontal axis being a time axis and a vertical axis being a speed axis. In FIG. 9A, an area between two broken lines corresponds to an execution area of the feedforward controlling. Before and after the area corresponding to the feedforward controlling, the feedback controlling for the CR motor 13 is performed.

The execution area of the feedforward controlling corresponds to the obstructing area. The speed shown in the graph could be understood as the speed eliminating the error that may occur due to the dirt 70. It is noted that divergence of the speed of the carriage 12 from the target speed Vtar in FIG. 9A is caused since the controlling input value U in the feedforward controlling is insufficient with respect to the target speed Vtar.

According to this example, the speed Vp immediately after the end of the feedforward controlling area is outside the allowable error range of the speed Vp between dashed lines in the vertical axis direction. At this stage, the processor 3 proceeds to S270 to update the compensation amount C so that the compensation amount is increased from the current value C0 by δC (=β·(Vtar−Vp)) which is proportional to the deviation (Vtar−Vp).

It is noted that the coefficient β is determined by obtaining a plurality of samples of a set of the speed deviation dV=(Vtar−Vp) observed when the compensation amount C=0, and the compensation amount C which is added to the standard controlling input value Uff in order to make the speed deviation dV to substantially zero by experiments, and obtaining an approximation straight line derived from the thus obtained samples.

Figure 10:
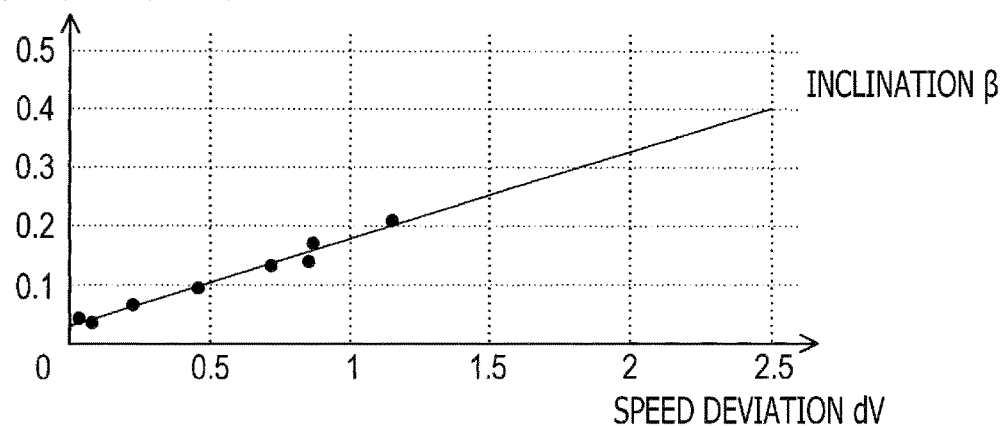
FIG. 10 is a graph showing a relationship between a velocity deviation and a compensation amount.

FIG. 10 is a graph showing an example of such an approximation straight line. In the graph shown in FIG. 10, the horizontal axis represents the speed deviation dV and the vertical axis represents the compensation amount C. Black dots indicate the samples obtained by the experiments and a linear straight line is the approximate straight line based on the samples.

The coefficient β could be determined for each combination of the target speed Vtar that could be set by the image forming system 1 and the moving direction of the carriage 12, and stored in the EEPROM 6. In other words, the EEPROM 6 is configured to store the coefficient β, which should be used for calculating the compensation amount C when the carriage 12 moves in the forward/backward direction, for each target speed Vtar.

After updating, in S270, the compensation amount C using the coefficient β described above and the speed deviation (Vtar−Vp), the processor 3 proceeds to S280. When it is determined that the speed Vp is within the allowable error range (S260: YES), the processor 3 proceeds to S280 without performing S270, that is, without updating the compensation amount C.

In S280, the processor 3 controls the recording head 11 through the ASIC 2 so as to cause the recording head 11 to perform the flushing operation. Thereafter, the processor proceeds to S300 and performs a process of forming an image based on the print target data on the printing sheet P, the compensation amount C being successively updated, as necessary, during the process (S300-S480).

That is, the processor 3 repeatedly performs a process of conveying the printing sheet P by a particular amount, moving the carriage 12 to a return point while causing the recording head 11 to form a one path of image on the printing sheet P during movement of the carriage 12, until a series of image formation based on the print target data is completed. At every movement of the carriage 12 to the return point, the processor 3 determines whether the speed Vp of the carriage 12 is within the allowable error range, and updates the compensation amount C when the carriage speed Vp is not within the allowable error range.

The one path of image means an image formed on the printing sheet P by the ejection operation of the ink droplets of the recording head 11 during a process of the carriage 12 moving in the main scanning direction from one return point to the other return point in the main scanning direction.

According to the present embodiment, the processor 3 switches the moving direction of the carriage 12 from the backward direction to the forward direction in S300. Thereafter, the processor 3 sets the standard controlling input value Uff and the compensation amount C to the ASIC 2 (S310). For example, the processor 3 sets the standard controlling input value Uff which has been determined in advance for a combination of the forward direction and the target speed Vtar, and the latest compensation amount C which has been determined in advance for a combination of the forward direction and the target speed Vtar to the ASIC 2. It is noted that the values set to the ASIC 2 correspond to appropriate values of the standard controlling input value Uff and the compensation amount C in order to cause the carriage 12 to pass through the obstructing area at the target speed of Vtar in the forward direction.

Thereafter, the processor 3 performs the main scanning direction printing process while moving the carriage 12 in the forward direction (S320). In the main scanning direction printing process, the processor 3 causes the carriage 12 to move, in the forward direction, to the return point at the target speed Vtar (i.e., at a constant speed) by causing the CR motor controller 32 to perform the motor controlling process shown in FIG. 7. Further, the processor causes the recording controller 31 to drive the recording head 11 to form a one-path image on the printing sheet P.

While the carriage 12 passes through the obstruction area in the forward direction, the CR motor controller 32 performs the feedforward controlling of the CR motor 13 with the controlling input value of U (=Uff+C) based on the standard controlling input value Uff and the compensation amount C set in S310.

After performing the main scanning printing process in S320, the processor 3 obtains the speed Vp of the carriage 12 immediately after passing through the obstructing area (S330) and determines (S330) whether the obtained speed Vp is within the allowable error range as in S260.

When it is determined that the speed Vp is within the allowable error range (S340: YES), the processor 3 skips S350 and proceeds to S360. When it is determined that the speed Vp is not within the allowable error range (S340: NO), the processor proceeds to S350.

In S350, the processor 3 updates the compensation amount C0, which is the current compensation amount C for the standard controlling input value Uff when the carriage 12 is moved in the forward direction at the target speed Vtar, into the compensated value C0+δC, the value δC being β·(Vtar−Vp) corresponding to the speed deviation (Vtar−Vp). Thereafter, the processor 3 proceeds to S360. It is noted that the value of the coefficient β used here (in S350) is a value determined for the combination of the moving direction (i.e., the forward direction) of the carriage and the target speed Vtar in S320.

In S360, the processor 3 determines whether printing for one page of the printing sheet P has been completed. When it is determined that the printing for one page has not been completed (S360: NO), the processor 3 proceeds to S370 and controls the LF motor controller 33 of the ASIC 2 to drive the LF motor 21 so that the printing sheet P is conveyed in the auxiliary scanning direction by a distance corresponding to one path of image.

Further, the processor 3 switches the moving direction of the carriage 12 (S380) and sets the standard controlling input value Uff and the latest compensation amount C to the ASIC 2 (S390). For example, the processor 3 sets the standard controlling input value Uff which has been determined in advance for the combination of the backward direction and the target speed Vtar, and the latest compensation amount C corresponding to the combination of the backward direction and the target speed Vtar to the ASIC 2.

Thereafter, the processor 3 performs the main scanning direction printing process while moving the carriage 12 in the backward direction (S400). In the main scanning direction printing process, the processor 3 moves, at the constant speed, the carriage 12 in the backward direction to the return point at the target speed Vtar by causing the CR motor controller 32 to perform the motor controlling process shown in FIG. 7. Further, the processor causes the recording controller 31 to drive the recording head 11 to form the one path of image on the printing sheet P.

In the moving process of the carriage 12, the linear encoder signal processor 34 operates as it does in S320. While the carriage 12 passes through the obstructing area in the backward direction, the feedforward controlling of the CR motor 13 is performed, within the obstructing area, with the controlling input value of U=Uff+C based on the standard controlling input value Uff and the compensation amount C set in S390.

After performing the main scanning direction printing process in S400, the processor 3 obtains the speed Vp of the carriage 12 immediately after the carriage 12 has passed through the obstruction area (S410) and determines whether the obtained speed Vp is within the allowable error range (S420) as in S260.

When it is determined that the speed Vp is within the allowable error range (S420: YES), the processor 3 skips S430 and proceeds to S440. When it is determined that the speed Vp is not within the allowable error range (S420: NO), the processor 3 proceeds to S430.

In S430, the processor 3 updates the compensation amount C0, which is the current compensation amount C for the standard controlling input value Uff when the carriage 12 is moved in the backward direction at the target speed Vtar, into the updated compensation amount C0+δC, the value δC being β·(Vtar−Vp). Thereafter, the processor 3 proceeds to S440. It is noted that the value of the coefficient β used here (in S430) is the value determined for the combination of the moving direction of the carriage 12 in S400 and the target speed Vtar.

In S440, the processor 3 determines whether printing for one page of the printing sheet has been completed. When it is determined that the printing for one page has not been completed (S440: NO), the processor proceeds to S450 and cause the LF motor controller 33 of the ASIC 2 to drive the LF motor 21 so that the printing sheet P is conveyed in the auxiliary scanning direction by a distance corresponding to one path of image. Thereafter, the processor 3 proceeds to S300 and, until printing on one page of the printing sheet P is completed, the processor 3 repeatedly performs the processes in S300-S450.

When it is determined that the printing on one page of the printing sheet P has been completed (S360: YES, or S440: YES), the processor 3 performs a discharging process to discharge the printing sheet P on which the image has been formed, thereby the printing sheet P being discharged on a discharge tray as the processor 3 drives the LF motor 21 through the ASIC 2.

When the print target data contains a plurality of pages of images, it is determined that there remains a next page (S470: YES), and the processor 3 performs the printing process for the next page (S480). The process performed in S480 includes the same processes to a process of feeding the printing sheet P for the next page and the processes in S300-S460. Until the printing process is completed for all the pages, the processor 3 repeatedly performs the process in S480. When printing for all the pages has been completed (S470: NO), the processor terminates the printing process shown in FIGS. 5, 6A and 6B.

As described above, the image forming system 1 according to the present embodiment includes the moving system of the carriage 12. In the image forming system 1, the processor 3 and the ASIC 2 functions as controllers to move the carriage 12. The processor 3 estimates an area in which reading of the linear scale 46 by the optical sensor 47 is obstructed by the dirt 70, in other words, an area in which abnormality may occur in the measurement values of position and speed using the encoder signals.

The processor 3 calculates the deviation E (i.e., Vtar−Vp) of the measured speed Vp of the carriage 12 with respect to the target speed Vtar, as a control error of the CR motor 13 within the obstructing area in which the feedforward controlling is performed, based on the encoder signal immediately after the optical sensor 47 has passed through the obstructing area (S270, S350 and S430).

Based on the speed deviation E, the processor 3 updates the compensation amount C (S270, S350 and S430) by calculating the increment δC (i.e., β(Vtar−Vp) of the compensation amount C of the standard controlling input value Uff in the feedforward controlling and adding the increment δC to the compensation amount C. The compensation amount C is prepared for each combination of the moving direction of the carriage 12 and the target speed Vtar, and updating of the compensation amount C is performed for each combination of the moving direction of the carriage 12 and the target speed Vtar.

During a period where the carriage 12 (specifically, the optical sensor 47) passes through the obstructing area, the CR motor controller 32 compensates the standard controlling input value Uff using the latest compensation amount C corresponding to the moving direction and the target speed Vtar and performs the feedforward controlling of the CR motor 13 (S550, S560) using the compensated controlling input value U (i.e., Uff+C).

According to the present embodiment, the feedback controlling (S520, S530) and the feedforward controlling (S550, S560) are executed in a switched manner as a controlling of the CR motor 13. When the optical sensor 47 enters the obstructing area where the measurement value of the motion parameters of the carriage 12 used in the feedback controlling exhibit abnormality, the controlling of the CR motor 13 is switched from the feedback controlling to the feedforward controlling and the feedforward controlling is maintained until the optical sensor 47 passes through the obstructing area. Since the control error occurs easily due to deviation of the controlling input value U with respect to the appropriate value in the feedforward controlling, controlling of the motor is switched to the feedback controlling (S520, S530) immediately after the optical sensor 47 has passed through the obstructing area.

Even with the above-mentioned controlling, however, the control error occurred in the obstructing area causes the error in impacting points on the printing sheet P of the ink droplets ejected from the recording head 11, and deterioration of the quality of the image formed on the printing sheet P occurs. Therefore, according to the present embodiment, with use of the compensation amount C which is calculated based on the control error when the optical sensor 47 passed through the obstructing area in the past, the controlling input value U is compensated from the standard controlling input value Uff and the feedforward controlling in the obstructing area is performed.

Therefore, according to the present embodiment, the feedforward controlling within the obstructing area can be performed with suppressing the control error. That is, with the image forming system 1 according to the present embodiment, it is possible to control movement of the carriage 12 with high accuracy, thereby forming a high-quality image on the printing sheet P.

Figure 9B:
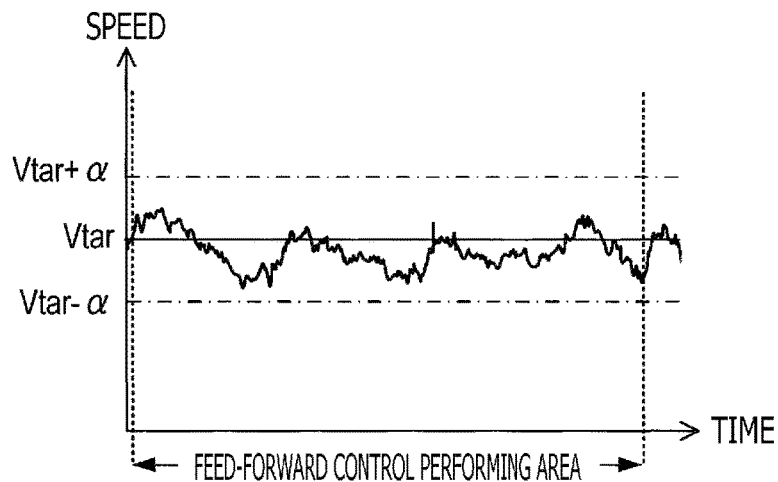
FIG. 9B is a graph showing the change of the speed when the feedforward controlling is performed based on an appropriately compensated control input.

FIG. 9B is a graph showing, in a manner similar to the graph shown in FIG. 9A, time variation of the speed of the carriage 12 when the feedforward controlling is performed using the compensation amount C which is set by a method according to the present embodiment. As is understood by comparing FIG. 9B with FIG. 9A, according to the present disclosures, control error of the speed in the feedforward controlling within the obstructing area is reduced.

It is particularly worthwhile that, according to the present embodiment, the compensation amount C is prepared and updated for each moving condition. That is, the compensation amount C is prepared for each of the forward direction and the backward direction along the main scanning direction which is the moving direction of the carriage 12. Further, for each direction, the compensation amount C is prepared in relation to each target speed Vtar of the carriage 12.

Load applied to the carriage 12 includes a tensional force which is applied thereto from a tube supplying ink to the recording head 11 and a viscous frictional force generated in association with movement of the carriage 12. Therefore, the load that operates to the carriage 12 could vary depending on the moving direction and the moving speed of the carriage. Therefore, to prepare the compensation amount C for each moving condition contributes to the highly precise feedforward controlling of the carriage 12.

Further, according to the present embodiment, when an image is formed on the printing sheet P with making the carriage 12 perform a linear reciprocal movement, the processor 3 updates, at each of the movements of the carriage 12 in respective directions, the compensation amount C of the controlling input value Uff in the corresponding direction based on the speed Vp immediately after the carriage 12 has passed through the obstructing area. Further, when the CR motor 13 is controlled to move the carriage 12 in the respective directions, the processor 3 performs the feedforward controlling in the obstructing area using the compensation amount C updated when the carriage 12 was previously moved in the same direction.

That is, according to the present embodiment, at every occurrence of a first event in which the optical sensor 47 passes through the obstructing area in the forward direction, based on the speed Vp identified from the encoder signal after the first event has finished, the compensation amount C corresponding to the speed deviation E=Vtar−Vp is determined. Then, the controlling input value Uff for the CR motor 13, which is input during the period while the optical sensor 47 passes through the obstructing area in the forward direction again, is compensated based on the compensation amount C for the same direction determined as described above.

Similarly, at every occurrence of a second event in which the optical sensor 47 passes through the obstructing area in the backward direction, based on the speed Vp identified from the encoder signal after the second event has finished, the compensation amount C corresponding to the speed deviation E=Vtar−Vp is determined. Then, the controlling input value Uff for the CR motor 13, which is input during the period while the optical sensor 47 passes the obstructing area again in the backward direction, is compensated based on the compensation amount C for the same direction determined as described above.

Therefore, according to the present embodiment, even for variation of load in a short period, an appropriate feedforward controlling can be performed at a high accuracy and a high-quality image can be formed on the printing sheet P.

It is noted that the present disclosures do not need to be limited to the above-described embodiment, but can be modified in various ways.

The present disclosures can be applied not only the image forming system 1 configured to form an image on the printing sheet P, but also to various systems configured to realize movement of a processing head which perform a particular process to a processing target with use of a motor controlling using an encoder.

It is noted that the present disclosures can be applied not only to the inkjet printer but also other serial printers or garment printers. The present disclosures may be applied to a system configured to eject processing liquid to fix toner after the toner has applied onto a sheet. The present disclosures may also be applied to machines configured to print circuit patterns and machine tools such as a cutting machine. Further, the present disclosures may be applied not only to systems configured to process target objects, but also to driving systems configured to drive a driven object in accordance with a motor controlling using an encoder.

It is further note that the encoder does not need to be limited to the above-described linear encoder 14. For example, instead of the linear encoder 14, a reflection type linear encoder, which is configured such that the light emitted by the light emitting element is reflected by the encoder scale, and a light receiver receives the reflected light to read the encoder scale, may be used. When such a reflection type linear encoder in which the light sensor reads the encoder scale from an oblique direction, the obstructing area as referred to in S510, S610, S620 in the above-described embodiment may not be just in front of the area where the dirt is adhered but the movable area of the optical sensor which may be obliquely shifted by a particular amount from the front side in accordance with the reading angle of the optical sensor with respect to the encoder scale.

The present disclosures can be applied to a driving system employing a rotary encoder. As such a system, there have been known an encoder configured such that a sensor relatively moves with respect to a fixed encoder scale and another encoder configured such that an encoder scale moves with respect to the fixed sensor. The present disclosures can be applied to the driving system employing either of the such encoders.

It is noted that the present disclosures can be applied to a system which is configured such that a rotary encoder in which an encoder scale rotates with respect to a fixed sensor is connected to a rotation shaft of a motor, and movement of a target object driven by the motor is controlled based on an output signal from the rotary encoder. In that case, the encoder scale configured to rotate is an example of a scale part provided with a scale, and the fixed sensor is an example of an encoder sensor.

It is noted that, in the above-described embodiment, the standard controlling input value Uff and the compensation amount C are stored for each of the moving directions and the target speeds Vtar. However, the standard controlling input value Uff and the compensation amount C may not be stored for each of the moving directions and the target speeds Vtar.

For example, only the standard controlling input value Uff and the compensation amount C for a representative target speed Vtar0 may be stored, while when the carriage 12 is moved at the target speed Vtar which is different from the representative target speed Vtar0, the standard controlling input value Uff and the compensation amount C corresponding to the representative target speed Vtar0 are compensated and the feedforward controlling may be performed using the compensated value. Regarding the coefficient β, the above-described embodiment may be modified in a similar manner.

It is noted that functions realized by one component may be shared by a plurality of components. Further, functions realized by a plurality of components may be integrated into one component. For example, the controller may not consist of the processor 3 and the ASIC 2, but may consist of one or more processors without the ASIC, may consist of one or more ASIC's without a processor, or may consist of one or more processors and one more ASIC's. One or more components of a controller which includes at least one of the processor and the ASIC can perform, in association with each other, the processes performed by the controller according to the present disclosures.

Further, a part of a configuration of the above-described embodiment may be omitted. It is noted that any aspects of technical features set forth in claims should be regarded aspects of the present disclosures.

What is claimed is:

1. A motor driving system comprising:
  a motor;
  a driven object configured to be driven by the motor;
  an encoder having
    a scale part provided with a scale, and
    an encoder sensor configured to relatively move with respect to the scale part in association with the driven object, the encoder sensor being configured to output an encoder signal by reading the scale of the scale part; and a controller configured to control movement of the driven object by controlling the motor based on the encoder signal, wherein the controller performs estimating an obstructing area within a moving range of the encoder sensor relative to the scale part based on the encoder signal, the obstructing area being an area corresponding to a portion of the scale part where an obstacle is adhered, the obstacle obstructing reading of the scale of the scale part by the encoder sensor, calculating a control error of the motor in the obstructing area based on the encoder signal output after the encoder sensor passes through the obstructing area, determining, based on the control error, a compensation amount of a controlling input value for the motor while the encoder sensor passes through the obstructing area, controlling the motor such that the controlling input value for the motor while the encoder sensor passes through the obstructing area is compensated based on the compensation amount, measuring a motion parameter of the driven object based on the encoder signal, the motion parameter being is a parameter related to movement of the driven object, and calculating a deviation, as the control error, between a measurement value of the motion parameter based on the encoder signal output after the encoder sensor passes through the obstructing area and a target value of the motion parameter, determining, based on the deviation, the compensation amount for compensating the controlling input value to suppress the deviation, controlling the motor with a first controlling input value for feedforward controlling while the encoder sensor passes through the obstructing area, and calculating a second controlling input value for feedback controlling based on second deviation between the measurement value of the motion parameter and the target value of the motion parameter, and controlling the motor with the second controlling value while the encoder sensor passes through an area other than the obstructing area, wherein the compensation amount is used to compensate the first controlling input value for the feedforward controlling.

2. The motor driving system according to claim 1, wherein the motion parameter is a speed of the driven object, and wherein the controller performs measuring the speed of the driven object based on the encoder signal, and controlling the motor such that the drive object moves at a constant target speed, and determining the compensation amount for controlling the driven object to move at the constant target speed based on deviation between the measurement value of the speed after the encoder sensor passes through the obstructing area and the constant target speed.

3. The motor driving system according to claim 1, wherein the driven object is positioned such that the driven object moves with the encoder sensor relative to the scale part in a first direction and a second direction different from the first direction, and wherein the controller performs calculating a first control error which is the control error of the motor while the encoder sensor moves, with respect to the scale part, within the obstructing area in the first direction, and calculating a second control error which is the control error of the motor while the encoder sensor moves, with respect to the scale part, within the obstructing area in the second direction, and determining, based on the first control error, a first compensation amount which is the compensation amount of the controlling input value for the motor while the encoder sensor moves within the obstructing area in the first direction, and determining, based on the second control error, a second compensation amount which is the compensation amount of the controlling input value for the motor while the encoder sensor moves within the obstructing area in the second direction.

4. The motor driving system according to claim 3, wherein the driven object is positioned such that the driven object performs linear reciprocal movement with the encoder sensor, along to the scale part, in the first direction and the second direction, the second direction is an opposite direction to the first direction.

5. The motor driving system according to claim 1, wherein the driven object moves such that the encoder sensor repeatedly passes through the obstructing area, and wherein the controller calculates the control error based on the encoder signal and determines the compensation amount based on the control error at every occurrence of an event in which the encoder sensor passes through the obstructing area, and compensates, based on the compensation amount, the controlling input value for the motor while the encoder sensor passes through the obstructing area again after determining the compensation amount.

6. The motor driving system according to claim 3, wherein the driven object moves such that the encoder sensor repeatedly passes through the obstructing area, wherein the controller calculates the first control error based on the encoder signal and determines the first compensation amount based on the first control error at every occurrence of a first event in which the encoder sensor passes through the obstructing area while moving in the first direction, and compensates, based on the first compensation amount, the controlling input value for the motor while the encoder sensor passes through the obstructing area again while moving in the first direction after determining the first compensation amount, and wherein the controller calculates the second control error based on the encoder signal and determines the second compensation amount based on the second control error at every occurrence of an event in which the encoder sensor passes through the obstructing area while moving in the second direction, and compensates, based on the second compensation amount, the controlling input value for the motor while the encoder sensor passes through the obstructing area again while moving in the second direction after determining the second compensation amount.

7. The motor driving system according to claim 1, wherein the driven object is a carriage mounting a processing head configured to perform processing a processed object, the carriage being configured to move while making the processing head face the processed object, and wherein the driving system is a driving system configured to move the carriage.

8. The motor driving system according to claim 7, wherein the processing head is a liquid droplet ejecting device configured to eject a liquid droplet toward an ejected object being the processed object.

* * * * *

UNITED STATES PATENT AND TRADEMARK OFFICE
CERTIFICATE OF CORRECTION

| | |
|---|---|
| PATENT NO. | : 11,318,771 B2 |
| APPLICATION NO. | : 17/001755 |
| DATED | : May 3, 2022 |
| INVENTOR(S) | : Sachie Kiriyama |

It is certified that error appears in the above-identified patent and that said Letters Patent is hereby corrected as shown below:

In the Claims

<u>Claim 1, Column 19, Line 24:</u>
Please change: "being is a parameter related to movement of the" to -- being a parameter related to movement of the --

Signed and Sealed this
Fifteenth Day of November, 2022

Katherine Kelly Vidal
*Director of the United States Patent and Trademark Office*